United States Patent
Bakos et al.

(10) Patent No.: US 7,963,100 B2
(45) Date of Patent: Jun. 21, 2011

(54) COOLING SYSTEM FOR HIGH-SPEED VEHICLES AND METHOD OF COOLING HIGH-SPEED VEHICLES

(75) Inventors: Robert J. Bakos, Wading River, NY (US); Vladimir V. Balepin, Manorville, NY (US); Anthony Castrogiovanni, Manorville, NY (US); Jason S. Tyll, Blue Point, NY (US)

(73) Assignee: Alliant Techsystems Inc., Minneapolis, MN (US)

( * ) Notice: Subject to any disclaimer, the term of this patent is extended or adjusted under 35 U.S.C. 154(b) by 1086 days.

(21) Appl. No.: 11/442,677

(22) Filed: May 25, 2006

(65) Prior Publication Data

US 2007/0006594 A1 Jan. 11, 2007

Related U.S. Application Data

(60) Provisional application No. 60/684,326, filed on May 25, 2005.

(51) Int. Cl.
*F02K 7/10* (2006.01)
*F02K 7/20* (2006.01)

(52) U.S. Cl. ............... 60/267; 60/266; 60/730; 60/768

(58) Field of Classification Search ............ 60/266, 60/267, 730, 39.181, 768; 244/135 R
See application file for complete search history.

(56) References Cited

U.S. PATENT DOCUMENTS

| | | | | |
|---|---|---|---|---|
| 2,602,289 A * | 7/1952 | Anxionnaz et al. | ............ | 60/267 |
| 2,820,599 A * | 1/1958 | Ackeret et al. | ............ | 60/266 |
| 2,829,501 A * | 4/1958 | Walls | ............ | 60/650 |
| 3,232,050 A * | 2/1966 | Robinson et al. | ............ | 60/671 |
| 3,260,044 A * | 7/1966 | Garraway | ............ | 60/266 |
| 3,516,254 A * | 6/1970 | Hammond | ............ | 60/267 |
| 3,932,996 A * | 1/1976 | Bammert et al. | ............ | 60/650 |
| 4,275,562 A * | 6/1981 | Fejer | ............ | 60/650 |
| 5,149,018 A | 9/1992 | Clark | | |
| 5,151,171 A | 9/1992 | Spadaccini et al. | | |
| 5,176,814 A | 1/1993 | Spadaccini et al. | | |
| 5,232,672 A | 8/1993 | Spadaccini et al. | | |
| 5,313,790 A * | 5/1994 | Barr | ............ | 60/267 |
| 6,089,012 A * | 7/2000 | Sugishita et al. | ............ | 60/736 |
| 6,584,778 B1 * | 7/2003 | Griffiths et al. | ............ | 60/782 |
| 6,619,031 B1 | 9/2003 | Balepin | | |
| 6,769,242 B1 | 8/2004 | Balepin | | |

OTHER PUBLICATIONS

Van Griethuysen et al., "High-Speed Flight Thermal Management," in Development in High-Speed-Vehicle Propulsion Systems, AIAA Series Progress in Astronautics and Aeronautics, vol. 165, 1996, pp. 525-579 and 581-601.

* cited by examiner

*Primary Examiner* — Ted Kim
(74) *Attorney, Agent, or Firm* — TraskBritt

(57) ABSTRACT

A cooling system for a high-speed vehicle may comprise a combustor wall at least partially enclosing a combustor and which is cooled using a coolant circulating in a Brayton cycle. The heated coolant may be expanded in a turbine, transfer heat to a fuel within a heat exchanger, and be compressed by a compressor before returning to the combustor wall. The combustor wall may be capable of withstanding high temperatures, higher than the temperature at which fuel coking may take place. Heat transfer takes place between the coolant and the combustor wall, and between the coolant and the fuel. A method of cooling an engine for a high-speed vehicle is also disclosed.

22 Claims, 3 Drawing Sheets

COOLING SYSTEM FOR HIGH-SPEED VEHICLES AND METHOD OF COOLING HIGH-SPEED VEHICLES

CROSS-REFERENCE TO RELATED APPLICATION

This application claims the benefit of U.S. Provisional Application No. 60/684,326, filed May 25, 2005.

BACKGROUND OF THE INVENTION

1. Field of the Invention

The present invention relates to a cooling system for use with a heat source. More specifically, the invention relates to a cooling system for the propulsion system of a high-speed vehicle including a cooling fluid circulating within a closed loop cycle.

2. State of the Art

Aircraft flight speeds in the high supersonic and hypersonic regimes cause severe aerodynamic heating and place severe demands on the structural and thermal capabilities of the engines and airframe. Thus, the performance and mission applications of ramjet and scramjet powered vehicles are dependent on protecting the engines and airframe from these high heat loads encountered at high supersonic and hypersonic speeds. At flight speeds near Mach 4, the air taken on board these vehicles becomes too hot to cool the engines and airframe. Therefore, the vehicle's fuel is conventionally used as the primary coolant.

Cooling systems, which use the latent and sensible heat capacities of aircraft turbine fuels, have long been used on high-performance aircraft. The heat required to heat fuel to its boiling point is known as sensible heat. The heat required to vaporize the fuel is known as the latent heat. Such cooling systems, though, are generally limited to moderate temperature applications to prevent fouling caused by thermal decomposition of the fuel. For example, hydrocarbon fuels may be used for direct cooling of the combustor of an engine. Since fuel overheating of a hydrocarbon fuel may cause coking, combustor wall temperature is restricted to a moderate value in the vicinity of 1000° K. For example, according to U.S. Pat. No. 5,151,171 to Spadaccini et al., incipient coking of JP-7 fuel starts at about 1250° F. (~950° K). Excess fuel may be used for cooling, providing a greater heat sink and preventing fuel overheating. This use of excess fuel naturally leads to performance deterioration. This supply of additional fuel, beyond the amount needed for combustion, is known as overfueling. Overfueling requires the added weight of the extra fuel, which will not be utilized for propulsion. The extra fuel enters the combustor, but is not fully burned in the combustion process, and is expelled in the form of exhaust.

A "physical heat sink" system is only efficient in cooling a vehicle to flight speeds of about Mach 5.5 to 6. These systems may not be appropriate for use on higher speed vehicles in which relatively higher temperatures will be encountered. Another alternative is to use an endothermic fuel cooling system to provide engine and airframe cooling. Endothermic fuel systems use fuels that have the capacity to absorb an endothermic heat of reaction in addition to sensible and latent heat. As a result, the fuel is capable of absorbing two to four times as much heat as fuels that only absorb sensible and latent heat.

Cracking the fuel is a process of breaking its long-chain hydrocarbon molecules into lighter molecules that absorb heat (an endothermic process). In an endothermic fuel, the heat sink capability of the fuel is made up of its sensible heat plus any net endothermic capacity derived from high fuel dissociation reactions. Hydrocarbon decomposition processes, such as fuel cracking, may be accompanied by carbon formation, or coking. Coking tends to foul heat transfer surfaces, which is undesirable. Thus, there are two parts to calculating the upper limit of a hydrocarbon fuel's heat sink capability: the maximum temperature achievable without the system coking up, and the endothermic capacity of the cracking reactions that can occur.

The "chemical heat sink" of the fuel's endothermic reaction may enable cooling to Mach 6 to 6.5; however, at this point fuel cooling capacity reaches its maximum. Once the maximum combustor wall temperature has been reached, further acceleration is possible only if overfueling techniques are used. The combustor wall/fuel interface temperature is limited to preclude coking. Therefore, such a system might not be adequate to provide sufficient cooling for very high-speed vehicles and can present problems with short catalyst life, catalyst poisoning, special fuel handling and storage considerations, and reaction products having poor combustion properties.

Accordingly, what is needed in the art is a system for cooling high-speed vehicles without overfueling, improving scramjet engine performance and operability and expanding the Mach number capability to, and beyond, Mach 3 to 8+ for hydrocarbon fuels.

BRIEF SUMMARY OF THE INVENTION

The present invention relates to a cooling system for use to cool the engine of a high-speed vehicle. The cooling system includes a first fluid, which is the fuel to be used by the engine, and a second fluid, which is the coolant. A combustor of the engine may include a combustor wall, which may be structured to withstand high temperatures. The second fluid may be circulated within the combustor wall and heat may be transferred from the combustor wall to the second fluid, thus cooling the combustor wall.

The second fluid of the cooling system may travel in a closed Brayton loop. A compressor may compress the second fluid, and the second fluid may enter the combustor wall. Within the combustor wall, the second fluid may absorb heat of the combustion process. The heated second fluid may exit the combustor wall, where it expands in a turbine, which may be used to drive the compressor and a fuel pump, and provide additional power for the high-speed vehicle. The second fluid may enter a heat exchanger, wherein heat may be transferred from the second fluid to the fuel. The second fluid may then return to the compressor, closing the Brayton loop. The heated fuel may travel from the heat exchanger to the combustor, where it may be utilized to propel the high-speed vehicle.

In accordance with one aspect of the invention, a cooling system for an engine is provided. The cooling system includes a heat exchanger configured for heat exchange between a first fluid and a second fluid. A first fluid line is provided for transfer of the first fluid between the heat exchanger and a combustor of the engine. A second fluid line is provided for transfer of the second fluid between the heat exchanger and a wall at least partially enclosing the combustor of the engine.

In accordance with another aspect of the present invention, a method of cooling a combustor wall is provided. The method includes providing a first fluid comprising a fuel, providing a second fluid and transferring heat from the combustor wall to the second fluid, wherein the combustor wall exhibits a temperature higher than a maximum temperature at which the fuel will undergo coking. The second fluid is expanded in a turbine and heat is transferred from the second fluid to the first fluid. The second fluid is compressed and returned to the combustor wall.

In accordance with yet another aspect of the present invention, another cooling system for an engine is provided. The cooling system includes a fuel flow path for a first fluid and a coolant flow path for a second fluid. The coolant flow path includes a passageway through a heat exchanger configured for heat exchange between the first fluid and the second fluid and a passageway through a wall that at least partially encloses a combustor of the engine.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION OF THE INVENTION

Cooling of a high-speed vehicle and its propulsion system, such as a scramjet, may use a coolant referenced herein as a "second fluid" to cool the combustor of the high-speed vehicle. The fuel of the high-speed vehicle may be considered the first fluid. One embodiment of a cooling system may include a high-temperature combustor wall and a closed-loop Brayton cycle for the second fluid that includes a turbo-compressor, at least one passage within the combustor wall functioning as a first heat exchanger to cool the combustor wall, and a second fluid/fuel heat exchanger. Cooling systems for other high-speed vehicles such as, for example, hydrocarbon-fueled expendable hypersonic cruise missiles and reusable engine structures are also within the scope of the invention.

Figure 1:
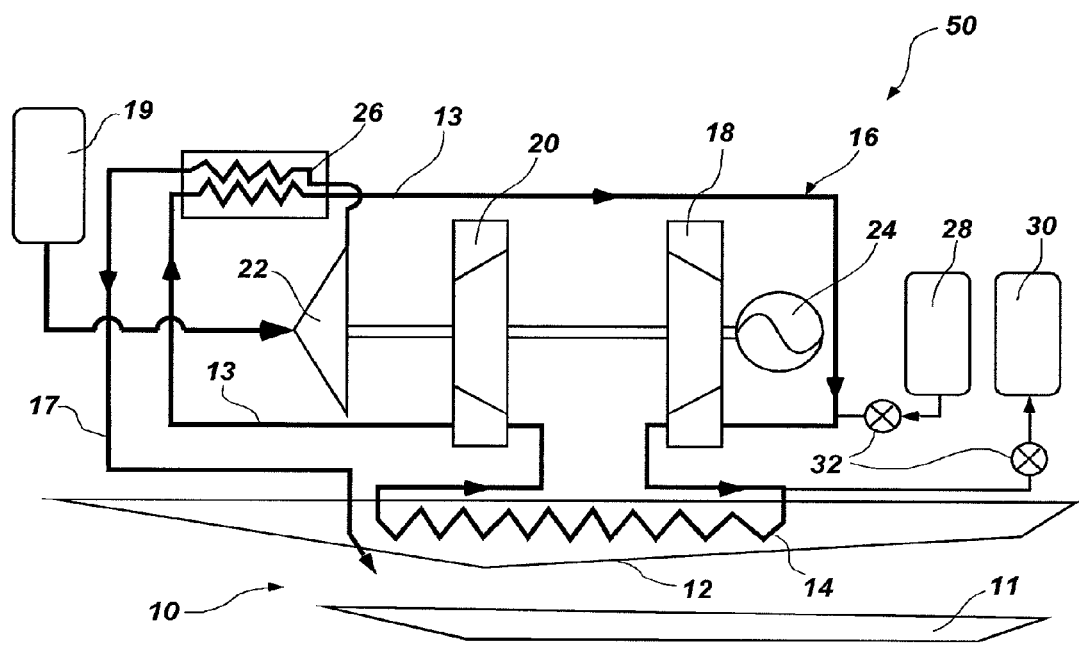
FIG. 1 is a schematic illustration of a cooling system in accordance with one embodiment of the present invention.

FIG. 1 schematically depicts a configuration of a second fluid cooling (SFC) system 50 for a heat source such as an engine 10, for example an engine used to propel a vehicle at hypersonic speeds and which is referred to herein as a hypersonic engine. The engine 10 includes a combustor 11, which may be a part of a combustor assembly including a nozzle. A combustor jacket or wall 12 enclosing the combustor 11 (only a portion of the enclosing wall 12 is shown for sake of convenience and clarity) may be cooled by a circulating coolant comprising the second fluid 13. The second fluid 13 may circulate through the combustor wall 12 within a coolant flow path 14 as part of a closed Brayton cycle loop 16.

In one embodiment of the closed Brayton cycle loop 16, before the system is initiated, the pipelines of the closed Brayton cycle loop 16 may be either pre-filled with the second fluid 13 or filled with the second fluid 13 from a second fluid source 28 during initiation through a valve 32. An additional starter device for the system (not shown) may be required for pre-filling the pipelines. The circulating flow of second fluid 13 may be driven by a turbo-compressor including a compressor 18 and a turbine 20.

The second fluid 13 circulates through various components associated with the closed Brayton cycle loop 16. Before entering the combustor wall 12, the second fluid 13 is compressed in the compressor 18. The compressor 18 may be mechanically connected to and driven by the turbine 20 of the turbo-compressor. The turbine 20 is fed by the second fluid 13, as described hereinbelow. In use, the compressed second fluid 13 exits the compressor 18 and enters the combustor wall 12 at a relatively low temperature. The second fluid 13 exits the combustor wall 12 at a relatively higher temperature, having absorbed heat from the combustor wall 12 while circulating therethrough. The second fluid 13, heated by the combustor wall, expands in the turbine 20, rotating the turbine 20. The rotating turbine 20 may be mechanically coupled to and drive the compressor 18 and, optionally, fuel pump 22, electric power generator 24 or both. Thus, part of the turbo-compressor power may be used for pumping fuel and providing other vehicle power needs.

After expansion in the turbine 20 and before compression in the compressor 18, the second fluid 13 is passed through a heat exchanger 26. Both the second fluid 13 and fuel 17 may circulate through the heat exchanger 26, and heat may be transferred from the second fluid 13 to the fuel 17. The heat exchanger 26 may be a combined heat exchanger and fuel converter or reactor to provide a fuel cracking capability. The fuel 17 may be fed from a fuel tank 19 and driven by the fuel pump 22 through the heat exchanger 26 directly to the engine combustor 11.

The second fluid 13, cooled in the heat exchanger 26, may return to the compressor 18, closing the Brayton cycle loop 16. The combustor wall 12 is heated by the combustion of the engine 10, yet is protected from severe, damaging temperatures by the circulating second fluid 13, acting as a heat sink. The heat of the engine 10 is eventually transferred to the fuel 17; however, the fuel 17 is not directly subjected to the high temperatures of the combustor wall 12. Avoiding contact with the high temperatures associated with the combustor wall prevents fuel coking.

The engine of the high-speed vehicle may pass through a plurality of different operating conditions. Therefore, different quantities of the second fluid 13 may be optimal for different operating conditions. The second fluid source 28 may be used to increase the amount of second fluid 13 circulating in the closed Brayton cycle loop 16. Additionally, a second fluid sink 30 may be used to reduce the amount of the second fluid 13 circulating when desired. This adjustment may be controlled by the valves 32.

Figure 2:
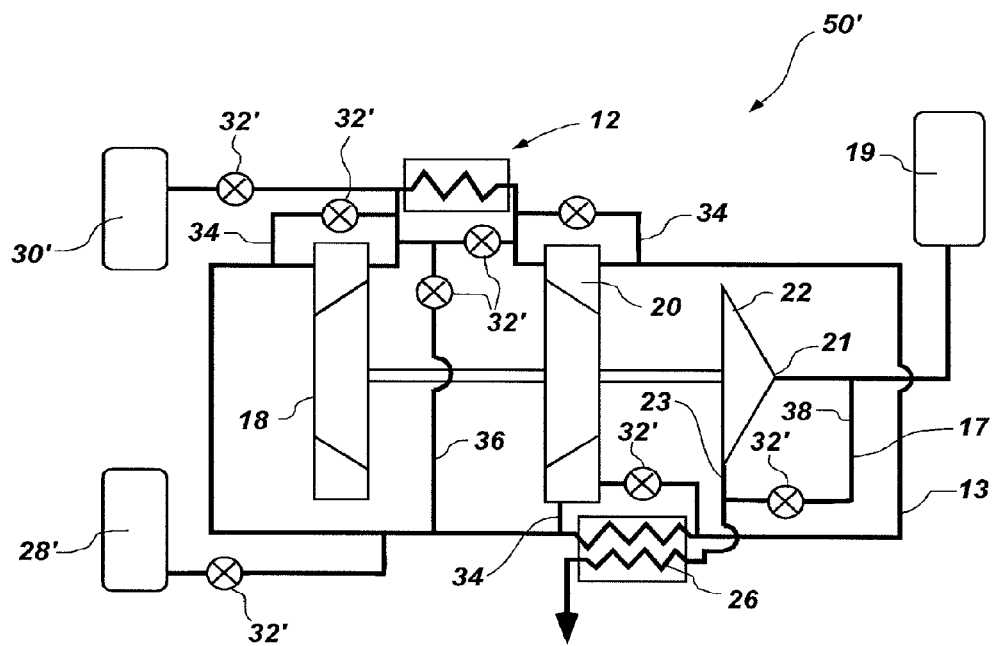
FIG. 2 is a schematic illustration of another embodiment of the cooling system of the present invention.

FIG. 2 depicts another configuration of a second fluid cooling system 50'. Flexibility in heat absorption and temperature control is provided by the inherent flexibility of the second fluid cooling (SFC) cycle. FIG. 2 shows some of the contemplated controls, bypasses and second fluid source 28' and second fluid sink 30' bottles, which may provide desired variations of the second fluid flow rate, temperature and pressure. Valves 32' may be used to selectively control introduction and removal of the second fluid 13 from the closed loop and, as desired, provide bypasses for the second fluid 13 around selected components of the system. Optional bypass pipelines 34 provide bypass routes for the second fluid 13 around the compressor 18, the combustor wall 12, the turbine 20, and the heat exchanger 26. A second bypass pipeline 36 enables at least a portion of the second fluid 13 to bypass both the turbine 20 and the heat exchanger 26. Additional control of the fuel flow rate may be provided by using a fuel bypass line 38, directing fuel 17 from the discharge point 23 of the fuel pump 22 back to the fuel pump inlet 21.

The second fluid 13 may comprise, for example, hydrogen, helium, nitrogen, xenon or any combination thereof. Gaseous hydrogen and gaseous helium second fluid systems may exhibit similar performance. Both fluids have a high heat capacity and gas constant; therefore, a heat exchanger 26 used with hydrogen or helium as a second fluid may be compact in size and the turbine 20 may require a lower gas temperature to actuate or drive the turbine than a system including a heavier gas. However, due to lower molecular weight and density, light gases may need bulky multistage compressors and turbines. Nitrogen may be useful as a second fluid 13 to reduce the required compressor and turbine weight and complexity, however the weight of the heat exchangers may be higher. A mixture of gases such as helium and xenon may provide a reasonable compromise. As noted above, a second fluid source 28 and a second fluid sink 30 may be provided for the selective addition and removal of the second fluid 13 to/from the system, as controlled by valves 32. Other types of conventional control devices may be used with the second fluid cooling system 50' to control the introduction or removal of second fluid 13.

The fuel 17 also referred to herein as the first fluid, may be, for example, a hydrocarbon fuel or liquid hydrogen. The SFC system 50' enables use of denser fuels without endothermic capability (e.g., JP-10 in place of JP-7). Mach 8+ conditions are attainable with SFC technology for JP-7 fueled systems. Power generation capacity at Mach 8 is estimated as 50 kW per 1 lb/s of the fuel flow rate.

A cooling system utilizing second fluid cooling technology may include a combustor wall 12 and a heat exchanger 26 as described hereinbelow. The combustor wall 12 may be constructed of a high-temperature material, which enables operation of the combustor at much higher temperatures and, therefore, much lower heat flux and a more favorable environment for combustion. According to the invention, the combustor wall 12 may be cooled with a second fluid 13, which may be a non-reactive fluid, optionally with a variable flow rate, and capable of high-temperature operation. The second fluid 13 may thus be used to transfer heat to the fuel 17 in comfortable and controllable thermal conditions in a second fluid/fuel heat exchanger 26. Optionally, functions of the second fluid cooling/fuel heating and endothermic fuel cracking may be combined in single heat exchanger/fuel converter (HEFC) unit 26.

In the second fluid cooling system 50, fuel 17 is supplied in the amount required for efficient combustion process, not in the excessive amount dictated by cooling needs for conventional systems, for example, in the form of overfueling. This is possible due to the ability to efficiently operate the high-speed vehicle at higher combustor wall temperatures for an extended period of time. In a conventional engine configuration with direct fuel cooling, the wall temperature must remain at a constant, lower temperature to prevent fuel coking in the combustor wall or jacket. The use of the second fluid 13, for example, an inert coolant such as helium or nitrogen, for cooling the combustor wall 12 enables a much higher acceptable combustor wall temperature. The combustor wall 12 may be constructed of a high-temperature material such as a ceramic matrix composite (CMC) or refractory metal, which enables much lower heat flux through much higher wall temperatures. That is, the combustor wall may sustain a higher maximum temperature and, therefore, less heat must be removed from the combustor wall to maintain the temperature below this higher maximum temperature. Correspondingly, less heat must be transferred to the fuel, enabling fuel heating within coking limits at vehicle speeds into high Mach numbers.

Figure 3:
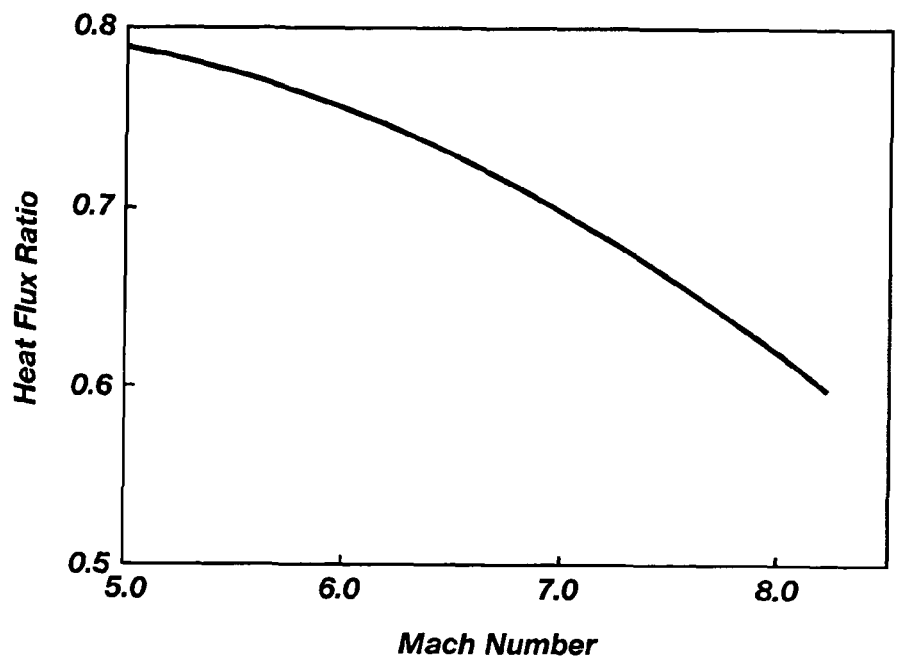
FIG. 3 is a graph of heat flux ratio over mach number.

FIG. 3 shows the ratio of the heat flux (that is, the amount of heat transferred from the combustor wall 12 to the fuel 17 (FIG. 1)), for a second fluid cooling system to the heat flux for a conventional, direct cooling system. The heat flux of a second fluid cooling system is less than 80% of the heat flux of a conventional system, and goes lower, down to 60%, as the flight velocity increases beyond Mach 8.

In both conventional, direct cooling techniques and SFC techniques, fuel ultimately acts as the end heat sink. Efficiency of the cooling method may be explained in terms of how far the heat sink is from saturation or how much fuel is necessary to provide an adequate heat sink. Ability of the fuel to absorb heat may be described by heat sink margin. Before the bulk fuel temperature reaches the coking limit and wall temperature reaches its limit, heat sink margin indicates how far the fuel heat sink is from the maximum possible heat sink at the coking limit.

If fuel temperature at a stoichiometric mixture ratio reaches the fuel-coking limit or if the wall reaches its material limit, extra fuel should be added for cooling purposes, even if it is excessive for the combustion needs. The heat sink margin will be negative to reflect the need for engine overfueling. Without engine overfueling, negative heat sink margin is not allowable for long periods of time, as fuel coking will occur, or the wall will degrade. With the use of overfueling, negative heat sink margin is possible at the expense of engine fuel efficiency. Thus, fuel heat sink margin may be presented in two forms:

If $T_{fuel} \leq T_{fuel}^{max}$ and $T_W^{max} \leq T_W^{lim}$ at stoichiometric fuel/air ratio, $\delta = 1 - Q_x/Q_{max} (\delta \geq 0)$;

If $T_{fuel} > T_{fuel}^{max}$ or $T_W^{max} > T_W^{lim}$ at stoichiometric conditions, $\delta = 1 - \phi (\delta < 0)$.

Where $T_{fuel}$ is the bulk fuel temperature at the cooling system exit;
$T_{fuel}^{max}$ is the fuel-coking limit;
$T_W^{max}$ is the temperature of the wall;
$T_W^{lim}$ is the material limit of the wall;
$\delta$ is the fuel heat sink margin;
$Q_x$ is the heat absorbed by the fuel;
$Q_{max}$ is the maximum heat to be absorbed by the fuel when the coking limit temperature is reached; and
$\phi$ is the equivalence ratio.

Figure 4:
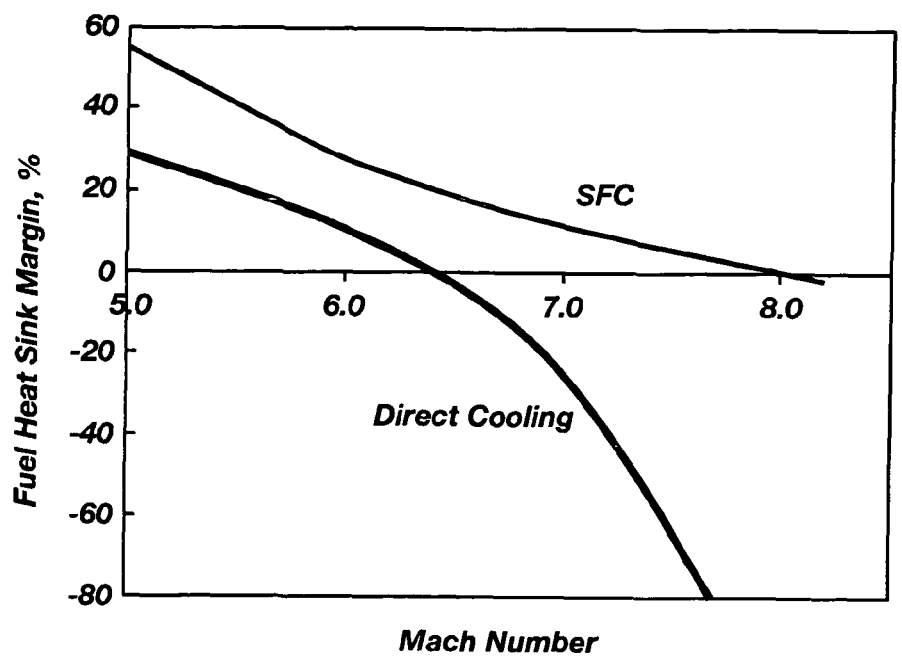
FIG. 4 is a graph of fuel heat sink margin over mach number.

As an illustrative example, FIG. 4 shows the comparison of the fuel heat sink margin for the direct cooling with endothermic hydrocarbon fuel and for second fluid cooling where the same fuel is the end heat sink but nitrogen is used as an interim media (i.e., the second fluid). It is seen that direct cooling can provide scramjet operation up to a velocity of Mach 6.4 with a positive heat sink margin, i.e., without overfueling. Prohibitive overfueling characterized by a negative fuel heat sink margin of less than minus 100 is required to reach a velocity of Mach 8. An SFC system extends the stoichiometric operation to Mach 8+ and the positive fuel heat sink margin of 1% to 2% is still available at Mach 8, as shown. The gentle slope of the second fluid cooling curve, as compared to the direct cooling curve, shown in FIG. 4, enables further flight velocity increase to speeds over Mach 8.0 with moderate engine overfueling.

In this manner, efficient cruise flight engine operation at a velocity of Mach 8, where fuel flow rate required for combustion is lower than during acceleration, may be enabled by SFC technology. Extension of the operational Mach number beyond Mach 8 is also possible as a result of this de-coupling of the combustor wall temperature from the fuel temperature and the fuel flow rate.

Figure 5:
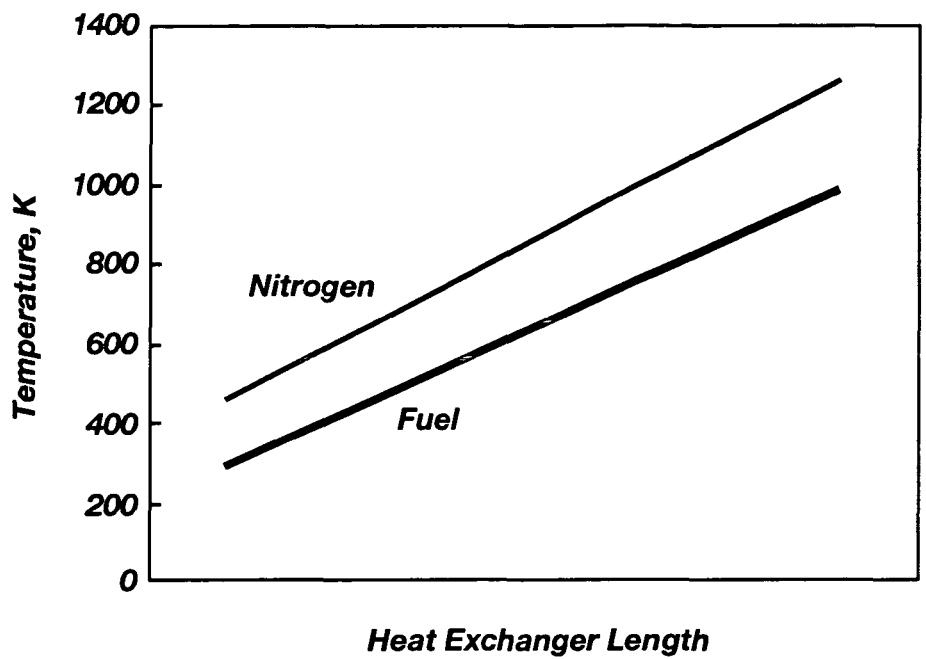
FIG. 5 is a graph of temperature over heat exchanger length.

Returning to FIG. 1, a heat exchanger 26 may be provided for heat exchange between the fuel 17 and the second fluid 13. The function of the heat exchanger 26 may optionally be combined with the function of endothermic fuel catalytic conversion. FIG. 5 shows a temperature profile at the design point corresponding to Mach 8 conditions for the heat exchanger with nitrogen/fuel flow rate ratio of approximately 3. The heat exchanger 26 may be a compact shell-and-tube nitrogen/fuel heat exchanger; however, any heat exchanger 26 for use with any second fluid 13 is within the scope of the invention. The heat exchanger 26 may have a custom design for weight and performance optimization. Conventional compact heat exchangers having a suitable specific weight for use with second fluid cooling are available. One example of a suitable heat exchanger is a shell-and-tube heat exchanger produced by Exergy Incorporated of Garden City, New York. The weight of the heat exchanger 26 may be reduced through heat transfer enhancement and different heat exchanger configurations, which are possible due to moderate cycle pressures.

The fuel 17, heated with the heat exchanger 26, may thus be prepared for injection and reaction in the combustor 11 in more predictable and controllable conditions, which may improve engine performance and controllability. Additionally, functions of the second fluid cooling/fuel heating and endothermic fuel cracking may be combined in single heat exchanger/fuel converter (HEFC) unit.

SFC engine hardware has been estimated to weigh 22% to 35% more than directly cooled engine hardware. However, as shown in FIG. 4, at velocities greater than Mach 6.4, an engine using direct cooling requires overfueling. Therefore, less fuel is needed if SFC techniques are utilized. The difference in fuel flow rate requirements between direct cooling techniques and SFC techniques increases with velocity, and the required flow rate of direct fuel cooling exceeds that of SFC techniques by more than 100% at velocities at or greater than Mach 8. Therefore, a vehicle with an SFC system will not need to carry as much fuel. This reduced fuel weight more than compensates for the added weight of the SFC hardware. Thus, an SFC system enables scramjet engine operation at high velocities where conventional scramjet operation is very fuel inefficient and the SFC system provides weight savings both in fuel and in combined hardware and fuel.

Figure 6:
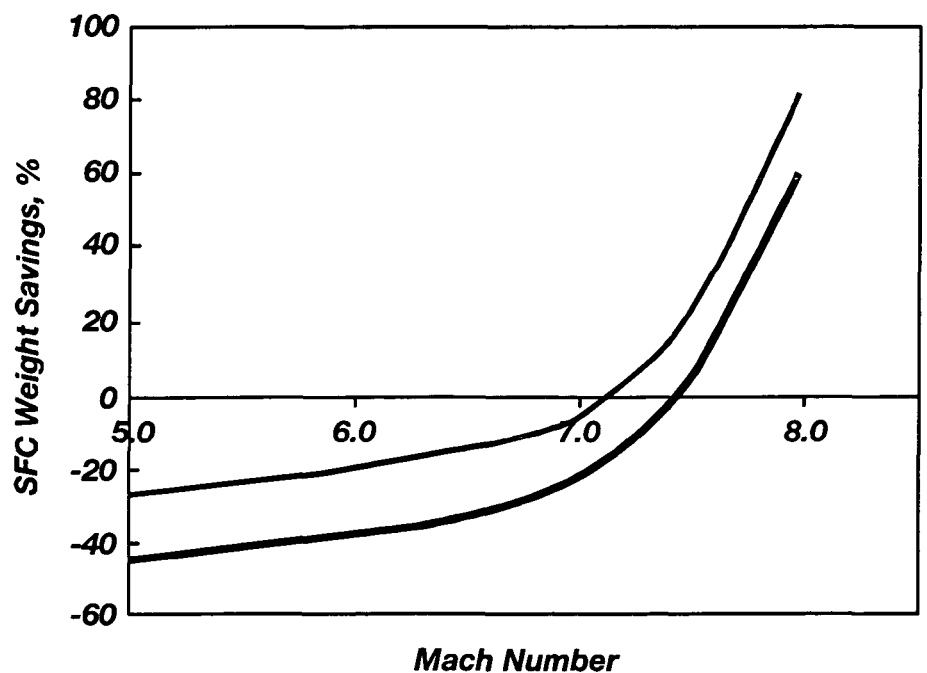
FIG. 6 is a graph of weight savings over vehicle velocity.

FIG. 6 shows the estimated weight saved, as a ratio of the difference in the combined engine hardware and fuel weight of a vehicle utilizing an SFC system and the combined engine hardware and fuel weight of a vehicle utilizing a conventional cooling system, to the weight of the conventional cooled engine hardware. The two lines reflect a minimum and a maximum of the estimated SFC engine hardware weight. The upper line reflects the ratio using a minimum estimated SFC engine hardware weight, and the lower line reflects the ratio using a maximum estimated SFC engine hardware weight. The same propulsion system hardware plus fuel weight in a vehicle utilizing an SFC system shows an advantage in weight savings when the vehicles reach a velocity of approximately Mach 7.2 to 7.5, as compared to a vehicle utilizing a conventional cooling system. For velocities of higher Mach numbers, utilization of an SFC system provides significant weight savings of about 70% to 80% of the conventional scramjet engine hardware weight at a velocity of Mach 8. Weight savings are increased even further when the duration of the cruise flight at velocities reaching high Mach numbers is extended.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A cooling system for a scramjet engine, comprising:
   a heat exchanger configured for heat exchange between a first fluid and a second fluid;
   a first fluid line for transfer of the first fluid between the heat exchanger and a combustor of the scramjet engine; and
   a closed-loop comprising a second fluid line for transfer of the second fluid sequentially from the heat exchanger to a compressor, from the compressor to a wall, the wall at least partially enclosing the combustor of the scramjet engine, from the wall to a turbine, and from the turbine to the heat exchanger.

2. The cooling system of claim 1, wherein the compressor is mechanically connected to and driven by the turbine.

3. The cooling system of claim 2, wherein the turbine is mechanically coupled to an electric power generator.

4. The cooling system of claim 1, wherein the second fluid comprises one of helium, hydrogen, nitrogen, xenon or mixtures thereof.

5. The cooling system of claim 1, wherein the first fluid comprises a fuel for the scramjet engine.

6. The cooling system of claim 1, wherein the closed-loop further comprises a bypass line around the compressor.

7. The cooling system of claim 1, wherein the closed-loop further comprises a bypass line around the wall at least partially enclosing the combustor.

8. The cooling system of claim 1, wherein the closed-loop further comprises a bypass line around the heat exchanger.

9. The cooling system of claim 1, wherein the closed-loop further comprises a bypass line around both the turbine and the heat exchanger.

10. The cooling system of claim 1, wherein the first fluid line further comprises:
    a passageway through a fuel pump having an inlet and an outlet;
    a bypass line in communication with the fuel pump inlet and the fuel pump outlet; and
    a valve disposed in the bypass line.

11. The cooling system of claim 1, further comprising a fluid source in communication with the second fluid line and configured to selectively provide a flow of fluid through the second fluid line.

12. The cooling system of claim 11, further comprising a fluid sink in communication with the second fluid line and configured to selectively receive a flow of fluid from the second fluid line.

13. A cooling system for a scramjet engine, comprising:
    a heat exchanger configured for heat exchange between a first fluid and a second fluid;
    a fuel flow path comprising a first fluid line for transfer of the first fluid between the heat exchanger and a combustor of the scramjet engine; and
    a closed-loop coolant flow path comprising a second fluid line for transfer of the second fluid sequentially from the heat exchanger to a compressor, from the compressor to a wall, the wall at least partially enclosing the combustor of the scramjet engine, from the wall to a turbine, and from the turbine to the heat exchanger.

14. The cooling system of claim 13, wherein the compressor is mechanically connected to and driven by the turbine.

15. The cooling system of claim 13, wherein the turbine is mechanically coupled to an electric power generator.

16. The cooling system of claim 13, wherein the closed-loop coolant flow path further comprises a bypass line around the compressor.

17. The cooling system of claim 13, wherein the closed-loop coolant flow path further comprises a bypass line around the wall at least partially enclosing the combustor.

18. The cooling system of claim 13, wherein the closed-loop coolant flow path further comprises a bypass line around the heat exchanger.

19. The cooling system of claim 13, wherein the closed-loop coolant flow path further comprises a bypass line around both the turbine and the heat exchanger.

20. The cooling system of claim 13, wherein the fuel flow path further comprises:
 a passageway through a fuel pump having an inlet and an outlet;
 a bypass line in communication with the fuel pump inlet and the fuel pump outlet; and
 a valve disposed in the bypass line.

21. The cooling system of claim 13, further comprising a fluid source in communication with the second fluid line and configured to selectively provide a flow of fluid through the second fluid line.

22. The cooling system of claim 21, further comprising a fluid sink in communication with the second fluid line and configured to selectively receive a flow of fluid from the second fluid line.

\* \* \* \* \*

UNITED STATES PATENT AND TRADEMARK OFFICE
CERTIFICATE OF CORRECTION

| | | |
|---|---|---|
| PATENT NO. | : 7,963,100 B2 | |
| APPLICATION NO. | : 11/442677 | |
| DATED | : June 21, 2011 | |
| INVENTOR(S) | : Robert J. Bakos et al. | |

It is certified that error appears in the above-identified patent and that said Letters Patent is hereby corrected as shown below:

In the specification:

COLUMN 6, LINE 58, change "Mach 8+and" to --Mach 8+ and--

Signed and Sealed this
Twenty-fourth Day of September, 2013

Teresa Stanek Rea
*Deputy Director of the United States Patent and Trademark Office*